(12) United States Patent
Matsui et al.

(10) Patent No.: US 8,792,184 B2
(45) Date of Patent: Jul. 29, 2014

(54) IMAGE-CAPTURING LENS

(75) Inventors: Kazuki Matsui, Hachioji (JP); Eigo Sano, Hino (JP); Yasunari Fukuta, Osaka (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 2 days.

(21) Appl. No.: 13/574,988

(22) PCT Filed: Dec. 22, 2010

(86) PCT No.: PCT/JP2010/073142
§ 371 (c)(1),
(2), (4) Date: Jul. 24, 2012

(87) PCT Pub. No.: WO2011/092983
PCT Pub. Date: Aug. 4, 2011

(65) Prior Publication Data
US 2012/0293874 A1 Nov. 22, 2012

(30) Foreign Application Priority Data
Jan. 27, 2010 (JP) .................................. 2010-015189

(51) Int. Cl.
*G02B 13/18* (2006.01)
(52) U.S. Cl.
USPC ............ 359/708; 359/689; 359/716; 359/784
(58) Field of Classification Search
USPC ......................... 359/708, 716, 784, 791, 792
See application file for complete search history.

(56) References Cited

U.S. PATENT DOCUMENTS

| 7,295,384 | B1* | 11/2007 | Sato et al. | 359/716 |
| 2005/0002119 | A1* | 1/2005 | Nakamura | 359/791 |
| 2005/0264671 | A1* | 12/2005 | Isono et al. | 348/335 |
| 2007/0109668 | A1* | 5/2007 | Isono | 359/791 |
| 2007/0229987 | A1* | 10/2007 | Shinohara | 359/784 |
| 2008/0137219 | A1* | 6/2008 | Noda | 359/795 |
| 2009/0251802 | A1* | 10/2009 | Chen et al. | 359/716 |

FOREIGN PATENT DOCUMENTS

| JP | 2006-84720 | 3/2006 |
| JP | 2006-243093 | 9/2006 |
| JP | 2006-309148 | 11/2006 |
| JP | 2007-114473 | 5/2007 |
| JP | 3989010 | 10/2007 |
| JP | 2008-203822 | 9/2008 |
| JP | 2008-276200 | 11/2008 |

* cited by examiner

*Primary Examiner* — Ricky Mack
*Assistant Examiner* — William Alexander
(74) *Attorney, Agent, or Firm* — Cozen O'Connor (57) ABSTRACT

An image-capturing lens includes, in order from an object side: a meniscus-shaped first lens which has positive power near an optical axis; a second lens which has positive power near the optical axis and has negative power in the periphery of the second lens; and a meniscus-shaped third lens. The image-capturing lens satisfies the following conditional formulas: $TL/f<1.10$, $2.00<(r2+r1)/(r2-r1)<4.00$, and $0.07<D2/f<0.19$, where TL: the air-converted distance from the object-side surface of the first lens to the image-side surface thereof, f: the focal length of the entire system, r2: the radius of curvature of the first lens on the image side thereof, r1: the radius of curvature of the first lens on the object side thereof, D2: the distance between the first lens and the second lens.

8 Claims, 5 Drawing Sheets

IMAGE-CAPTURING LENS

RELATED APPLICATIONS

This application is a U.S. National Phase Application under 35 USC 371 of International Application PCT/JP2010/073142 filed Dec. 22, 2010.

This application claims the priority of Japanese application No. 2010-015189 filed Jan. 27, 2010, the entire content of which is hereby incorporated by reference.

TECHNICAL FIELD

The present invention relates to an image-capturing lens of an image-capturing device employing a solid-state image-capturing element such as a CCD (Charge Coupled Device)-type image sensor or a CMOS (Complementary Metal-Oxide Semiconductor)-type image sensor, and further to a compact and thin image-capturing lens suitable to be mounted on a mobile terminal such as a notebook PC.

BACKGROUND

Compact and thin image-capturing devices have been mounted on mobile terminals which are compact and thin electronic devices such as mobile phones and PDAs (Personal Digital Assistants), which, thereby, has made it possible to transmit not only sound information but also image information to remote locations mutually.

As image-capturing elements used for these image-capturing devices, solid-state image-capturing elements such as CCD-type image sensors or CMOS-type image sensors are being used. Over recent years, with the advance of the size reduction of pixel pitch of image-capturing elements, enhanced pixel resolution has realized high resolution and high performance. On the other hand, maintenance of pixels has realized the size reduction of image-capturing elements.

As image-capturing lenses used for such image-capturing devices, image-capturing lenses having a 3 lens configuration are disclosed in patent publications (refer to Patent Documents 1-4).

PRIOR ART DOCUMENTS

Patent Documents

Patent Document 1: Japanese Patent No. 3989010
Patent Document 2: Unexamined Japanese Patent Application Publication No. 2007-114473
Patent Document 3: Unexamined Japanese Patent Application Publication No. 2006-084720
Patent Document 4: Unexamined Japanese Patent Application Publication No. 2008-276200

BRIEF DESCRIPTION OF HE INVENTION

Problems to be Solved by the Invention

In Patent Document 1, a positive-negative-negative power arrangement is employed and thereby further size reduction is difficult. In addition, spherical aberration and off-axis coma aberration are inadequately corrected and then F-number cannot be reduced.

In Patent Documents 2 and 3, a positive-positive-negative configuration is employed, which is more advantageous in total length reduction than in Patent Document 1. However, the total length is large, and off-axis coma aberration and astigmatism are inadequately corrected, resulting in no possibility of responding to enhanced pixel resolution.

In Patent Document 4, size reduction is realized compared to Patent Documents 1-3. However, off-axis aberration cannot be well corrected, which, thereby, cannot reduce F-number.

In view of these problems, the present invention was completed and an object thereof is to provide an image-capturing lens of a 3 lens configuration having well-corrected aberrations despite being more compact than any conventional lens.

Incidentally, with respect to the scale of a compact image-capturing lens, in the present invention, size reduction to the level satisfying the following conditional expression is targeted. When this conditional expression is satisfied, the lens total length can be reduced and also the lens external diameter can be reduced synergistically. Thereby, the size and weight reduction of the entire image-capturing device can be realized.

$$TL < 2Y' < 1.0$$

wherein

TL is the distance on the optical axis from the lens surface of the most object side of an image-capturing lens total system to the image side focal point and $2Y'$ is the image-capturing surface diagonal length of a solid-state image-capturing element (the diagonal length of the rectangular practical pixel area of the solid-state image-capturing element).

Herein, the "image side focal point" refers to the image point in the case where parallel light, which is parallel to the optical axis, enters the lens. Incidentally, in cases in which between the surface of the most image side of the image-capturing-lens and the image side focal point position, an optical low-pass filter, an IR cut filter, a band-pass filter, or a parallel flat plate such as seal glass for a solid-state image-capturing element package is arranged, it is assumed that the parallel flat plate portion is allowed to have air-converted distance and then the above TL value is calculated based thereon.

Means to Solve the Problems

1. An image-capturing lens having, in order from an object side, a first lens of a meniscus shape with a positive power near an optical axis and having a convex surface facing the object side and a concave surface facing an image side, a second lens of an aspherical shape with a positive power near the optical axis and a negative power in a periphery, and a third lens of a meniscus shape having a convex surface facing the object side and a concave surface facing the image side near the optical axis, in which the following conditional expressions are satisfied.

$$TL/f < 1.10 \tag{1}$$

$$2.00 < (r2+r1)/(r2-r1) < 4.00 \tag{2}$$

$$0.07 < D2/f < 0.19 \tag{3}$$

TL: an air-converted distance from the object side surface to the image side surface of the first lens f: a focal length of a total system r2: a curvature radius of the image side surface of the first lens r1: a curvature radius of the object side surface of the first lens D2: a paraxial distance of the first lens and the second lens The present lens is an image-capturing lens in which the total length satisfying Conditional Expression (1) is small and aberrations ranging from paraxial to off-axis aberrations can be well corrected. The basic configuration of the present invention to obtain an image-capturing lens which is compact and has well-corrected aberrations includes, in order from the object side, a first lens of a meniscus shape with positive power near the optical axis having a convex surface facing the object side and a concave surface facing the image side, a second lens of an aspherical shape with positive power near the optical axis and negative power in the periphery, and a third lens of a meniscus shape having a convex surface facing the object side and a concave surface facing the image side near the optical axis.

When the first lens ad the third lens are allowed to have a meniscus shape having a convex surface facing the object side, a long lens back can be ensured and at the same time, the total length can be reduced. Further, since the main point can be anteriorly positioned, excellent telecentric characteristics can be ensured.

To well correct aberrations with the decrease of the total length, Conditional Expressions (2) and (3) are more preferably satisfied.

To well correct curvature aberration and astigmatism in the periphery, the image side surface curvature radius r2 of the first lens having a convex surface needs to have a small value falling within the range shown in Conditional Expression (2). However, when r2 decreases, there are produced problems that off-axis come aberration increases and the total length increases, whereby the above has been difficult to realize. Therefor, the second lens is allowed to have positive power near the axis and negative power in the periphery and then the distance D2 between the first lens and the second lens are allowed to have an appropriate range, and thereby coma aberration is well corrected. Thereby, a configuration, in which the curvature radius of the first lens object side surface can be reduced, has been realized.

When near the axis of the second lens, positive power is provided, a configuration advantageous for the reduction of the total length is realized. Thereby, the curvature radius of the image side surface of the first lens can be reduced. Further, when the second lens power is allowed to be negative power with approaching the periphery and then the distance between the first lens and the second lens is allowed to fall within the range satisfying Conditional Expression (3), the lower end of off-axis light can be passed through the paraxial vicinity of the second lens; the lower end light passing near the center can be flipped down; and the upper end light passing in the periphery can be flipped up to well correct come aberration.

Further, the following conditional expressions are more preferably satisfied.

$$2.20 < (r2+r1)/(r2-r1) < 3.80 \quad (2')$$

$$0.10 < D2/f < 0.17 \quad (3')$$

When the lower limit of Conditional Expression (2') is underrun, aberrations are inadequately corrected in the periphery, and when the upper limit thereof is exceeded, off-axis come aberration is generated to a large extent and also the total length becomes large excessively. When the upper limit of Conditional Expression (2') is exceeded, come aberration becomes increased excessively, resulting in the difficulty of correction.

When the lower limit of Conditional Expression (3') is underrun or the upper limit thereof is exceeded, off-axis light cannot be corrected near the axis, resulting in the difficulty of correcting coma aberration.

2. The image capturing lens described in item 1, in which an aperture stop is arranged on the object side of the first lens.

When an aperture stop is arranged on the object side of the object side surface of the first lens, an exit pupil position can be arranged farther away from the image-capturing surface, and thereby the total length can be reduced with maintaining excellent telecentric characteristics.

3. The image capturing lens described in item 1, in which the second lens satisfies the following conditional expression.

$$\phi m/\phi p < -10 \quad (4)$$

$\phi$m: a power of the second lens in a position of a maximum light height $\phi$p: a power of the second lens near the optical axis To well correct off-axis curvature aberration and astigmatism with well-correcting coma aberration generated in the first lens, the power of the second lens periphery preferably falls within the range of Conditional Expression (4). When the upper limit of the conditional expression is exceeded, off-axis aberration is inadequately corrected and thereby excellent performance cannot be realized.

Further, the following range is more preferably satisfied.

$$\phi m/\phi p < -50 \quad (4')$$

Herein, the lens power $\phi$m in the position of the maximum light height is represented by $\phi$m tan ξ/Hm, provided that parallel light is allowed to enter the effective radius Hm in the lens object side surface of symmetry from the infinity of the object side and the inclined angle after passing through the lens is designated as ξ. Further, $\phi$p is the inverse of the focal length near the axis of the second lens (reference document: Unexamined Japanese Patent Application Publication No. 2004-326097).

4. The image capturing lens described in item 1, in which the third lens has a negative power near the axis.

The third lens preferably has paraxial negative power. When the third lens has negative power near the axis, Petzval sum can be reduced and in addition, axial chromatic aberration can be well corrected.

5. The image capturing lens described in item 4, in which the third lens satisfies the following conditional expression.

$$-3.30 < f3/f < -1.30 \quad (5)$$

where f3: a focal length of the third lens near the optical axis

The third lens more preferably satisfies Conditional Expression (5). When the paraxial power of the third lens satisfies Conditional Expression (5), the Petzval sum can be further reduced and in addition, axial chromatic aberration can be well corrected. When the upper limit of the conditional expression is exceeded, negative power is excessively increased, resulting in the difficulty of reducing the total length. When the lower limit of the conditional expression is underrun, aberrations are inadequately corrected and thereby excellent performance cannot be maintained.

6. The image capturing lens described in item 1, in which at least the image side surface of the third lens is formed into an aspherical surface and the aspherical surface has at least one aspherical inflection point.

When the image side surface of the third lens is allowed to have an aspherical shape with an inflection point, the telecentric characteristics of image side light flux tend to be easily ensured. Further, off-axis generated astigmatism and come aberration can be well corrected.

Herein, the "inflection point" refers to a point on an aspherical surface such that in a lens sectional-shape curve within an effective radius, the tangent plane of the aspherical top becomes a flat surface perpendicular to the optical axis.

7. The image capturing lens described in item 1, in which the second lens satisfies the following conditional expression.

$$n2 > 1.55 \quad (6)$$

where n2: a refractive index in d line of the second lens.

With well correcting come aberration generated in the first lens, in order to well correct off-axis curvature aberration and astigmatism, the refractive index of the second lens preferably falls within the range of Conditional Expression (6). When the refractive index of the second lens is allowed to be large, the power neat the axis and the power in the periphery can become differentiated from each other. Thereby, come aberration becomes easy to correct. Further, the negative power in the periphery can be increased and then off-axis curvature aberration and astigmatism can be well corrected.

Further, the following ranges are more preferably satisfied. where $$n2 > 1.65 \quad (6')$$

$$n2 > 1.75 \quad (6'')$$

8. The image capturing lens described in item 1, in which the first lens, the second lens, and the third lens are constructed of a material having heat resistance.

The construction using a heat resistant material makes it possible to withstand reflow treatment; to simultaneously mount electronic components and lens modules on the substrate; and to realize mounting on the substrate at reduced cost and in large mount.

Further, the first lens, the second lens, and the third lens are more preferably constructed of heat resistant glass.

Effects of the Invention

According to the image capturing lens of the present invention, a 3 lens configuration is employed, which makes it possible to well correct aberrations despite being more compact than any conventional lens.

EXAMPLES

Examples of the image capturing lens of the present invention will now be shown. The symbols used in each example are as follows:
 f: the focal length of the image capturing lens total system
 fB: back focus
 F: F number
 2Y: the image-capturing surface diagonal length of a solid-state image-capturing element
 R: curvature radius
 D: axial surface distance
 Nd: the refractive index with respect to d line of a lens material
 vd: the Abbe number of a lens material
 ENTP: the entrance pupil position based on the object side surface of the first lens
 EXTP: the exit pupil position based on the last surface of an image-capturing system
 H1: front side main point position
 H2: back side main point position Further, in surface data, the surface described using "*" after each surface number is a surface having an aspherical shape. The aspherical shape is represented by the following mathematical expression, provided that the top of the surface is designated as the origin; the X axis is taken in the optical axis direction; and the height of the perpendicular direction with respect to the optical axis is designated as h.

[Mathematical Expression 1]

$$X = \frac{h^2/R}{1 + \sqrt{1 - (1+K)h^2/R^2}} + \sum A_i h^i$$

where
Ai: i-th-order aspheric surface coefficient
R: curvature radius
K: conic constant Further, in the aspheric surface coefficient, a power of 10 (e.g., $2.5 \times 10^{-02}$) is represented using E (e.g., 2.5E−02).

Example 1

All specifications are shown below.
 f=3.73 mm
 fB=0.02 mm
 F=2.85
 2Y=4.48 mm
 ENTP=0 mm
 EXTP=−2.53 mm
 H1=−1.74 mm
 H2=−3.71 mm
Surface data is shown below.

| Surface Number | R (mm) | D (mm) | Nd | vd | Effective Radius (mm) |
|---|---|---|---|---|---|
| 1 | ∞ | 0.05 | | | 0.65 |
| 2 | ∞ | −0.20 | | | 0.65 |
| 3(*) | 1.200 | 0.66 | 1.58310 | 59.4 | 0.66 |
| 4(*) | 3.103 | 0.56 | | | 0.66 |
| 5(*) | −2.047 | 0.55 | 1.80540 | 26.1 | 0.76 |
| 6(*) | −2.292 | 0.61 | | | 0.97 |
| 7(*) | 5.064 | 0.63 | 1.58310 | 59.4 | 1.48 |
| 8(*) | 1.951 | 0.19 | | | 1.83 |
| 9 | ∞ | 0.21 | 1.51630 | 64.1 | 2.50 |
| 10 | ∞ | 0.26 | | | 2.50 |
| 11 | ∞ | 0.50 | 1.47140 | 65.2 | 2.50 |
| 12 | ∞ | 0.05 | | | |

Aspheric surface coefficients are shown below.
Third Surface:
K=0.18527E+00, A4=0.40371E−02, A6=0.75170 E−01, A8=−0.41896E+00, A10=0.14989E+01, A12=0.23719E+01, A14=0.15108E+01

Fourth Surface:
K=0.26566E+01, A4=0.60630E-01, A6=0.121834 E+00, A8=-0.10873E+01, A10=0.49170E+01, A12=-0.94452E+01, A14=0.78006E+01

Fifth Surface:
K=022806E+01, A4=-0.44187E-01, A6=-0.31563E+00, A8=0.17343E+01, A10=0.36610E+01, A12=0.33941E+01, A14=-0.11732E+00, A16=-0.15982E+01

Sixth Surface:
K=0.20184E+02, A4=-0.21738E+00, A6=0.32037E+00, A8=-0.19751E+00, A10=0.16050E+00, A12=-0.89934E-01, A14=0.88669E-01, A16=-0.53174E-01

Seventh Surface:
K=-0.50000E+02, A4=-0.22635E+00, A6=0.85598E-01, A8=-0.34808E-02, A10=-0.10815E-01, A12=0.28169E-02, A14=0.16260E-02, A16=-0.56920E-03

Eighth Surface:
K=-0.65692E+01, A4=-0.15984E+00, A6=0.79011E-01, A8=-0.34149E-01, A10=0.66428E-02, A12=0.46252E-03, A14=-0.47040E-03, A16.61266E-04

Single lens data is shown below.

| Lens | Initial Surface | Focal Length (mm) |
|---|---|---|
| 1 | 3 | 2.978 |
| 2 | 5 | 7648.429 |
| 3 | 7 | -5.882 |

Values corresponding to each conditional expression described above are shown below.
(1) TL/f-=1.07
(2) (r2+r1)/(r2-r1)=2.26
(3) φm/φp=-1170.14
(4) D2/f=0.15
(5) f3/f=-1.58
(6) n2=1.80540

Figure 1:
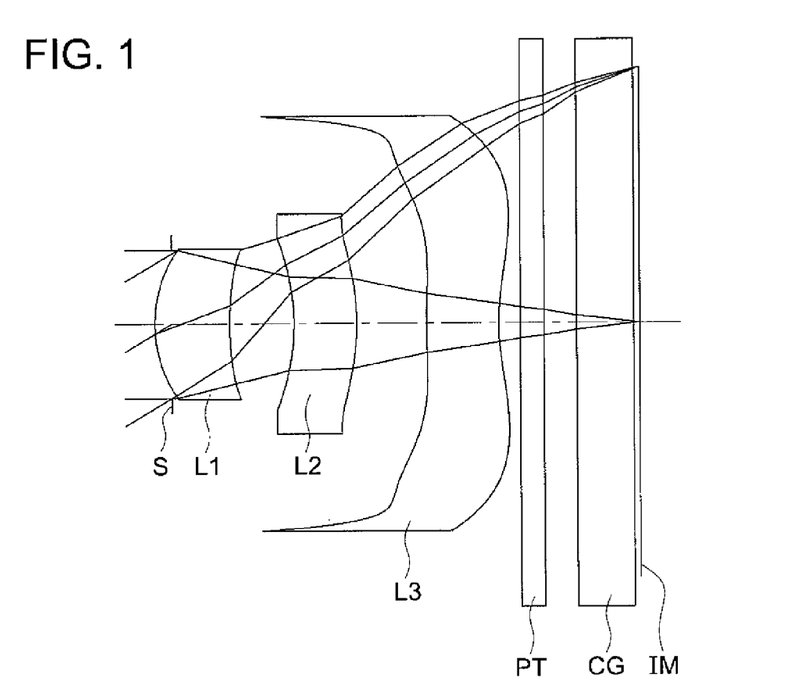
FIG. 1 is a cross-sectional view of the image capturing lens of Example 1.
Figure 2:
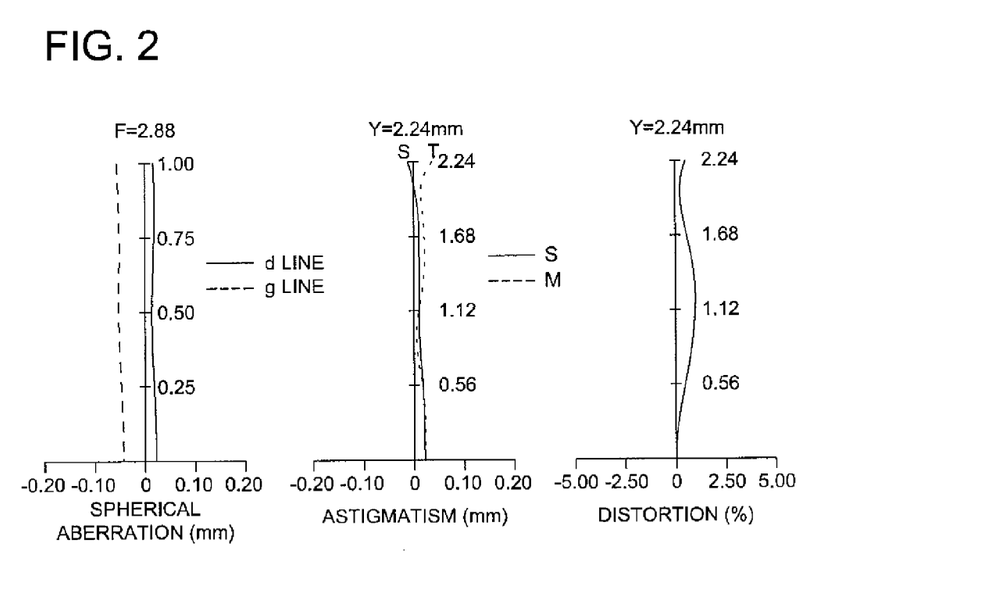
FIG. 2 is the aberration diagram of Example 1.

FIG. 1 is a cross-sectional view of the image capturing lens of Example 1. S represents the aperture stop, L1 represents a first lens, L2 represents a second lens, and L3 represents a third lens. PT represents an optical low-pass filter or IR cut filter, CG represents the cover gins of a solid-state image-capturing element, and I represents the image-capturing surface. FIG. 2 is the aberration diagram (spherical aberration, astigmatism, and distortion) of Example 1.

Example 2

All specifications are shown below.
f=3.74 mm
fB=0.13 mm
F=2.84
2Y=4.48 mm
ENTP=0 mm
EXTP=-2.38 mm
H1=-1.85 mm
H2=-3.61 mm Surface data is shown below.

| Surface Number | R (mm) | D (mm) | Nd | vd | Effective Radius (mm) |
|---|---|---|---|---|---|
| 1 | ∞ | 0.05 | | | 0.65 |
| 2 | ∞ | -0.21 | | | 0.65 |
| 3(*) | 1.127 | 0.69 | 1.58020 | 56.3 | 0.66 |
| 4(*) | 2.201 | 0.52 | | | 0.64 |
| 5(*) | -2.280 | 0.55 | 1.58020 | 56.3 | 0.76 |
| 6(*) | -2.474 | 0.61 | | | 1.00 |
| 7(*) | 3.534 | 0.61 | 1.58020 | 56.3 | 1.51 |
| 8(*) | 1.780 | 0.20 | | | 1.84 |
| 9 | ∞ | 0.15 | 1.51390 | 60.7 | 2.50 |
| 10 | ∞ | 0.18 | | | 2.50 |
| 11 | ∞ | 0.50 | 1.46920 | 61.7 | 2.50 |
| 12 | ∞ | 0.13 | | | |

Aspheric surface coefficients are shown below.

Third Surface
K=-0.16065E+00, A4=0.36307E-01, A6=0.73927E-01, A8=-0.60479E-01, A10=0.13803E+00, A12=0.16821E+00, A14=-0.19006E+00

Fourth Surface
K=0.65088E+01, A4=0.43977E-01, A6=0.70312E-01, A8=025260E+00, A10=0.24832E+00, A12=-0.19076E+01, A14=0.57815E+01

Fifth Surface
K=-0.14935E+02, A4=0.28182E+00, A6=0.14865E+00, A8=0.60631E-01, A10=0.26416E+00, A12=-0.17018E+01, A14=0.35440E+01, A16=-0.20804E+01

Sixth Surface
K=-0.20549E+01, A4=-0.13239E+00, A6=0.13404E+00, A8=0.13421E-01, A10=-0.36910E-01, A12=0.30183E-01, A14=0.10028E+00, A16=-0.82484E-01

Seventh Surface
K=-0.42140E+02, A4=-0.22333E+00, A6=0.74301E-01, A8=-0.10163E-01, A10=-0.51029E-03, A12=0.19621E-02, A14=-0.15602E-03, A16=-0.11872E-03

Eighth Surface
K=-0.10411E+02, A4=-0.11511E+00, A6=0.32495E-01, A8=-0.10621E-01, A10=-0.16396E-02, A12=0.15521E-03, A14=-0.12966E-03, A16=0.18035E-04

Single lens data is shown below.

| Lens | Initial Surface | Focal Length (mm) |
|---|---|---|
| 1 | 3 | 3.219 |
| 2 | 5 | 1191.466 |
| 3 | 7 | -7.087 |

Values corresponding to each conditional expression described above are shown below.
(1) TL/f=1.05
(2) (r2+r1)/(r2-r1)=3.10
(3) φm/φp=-50.79
(4) D2/f=0.14
(5) f3/f=-1.89
(6) n2=1.58020

Figure 3:
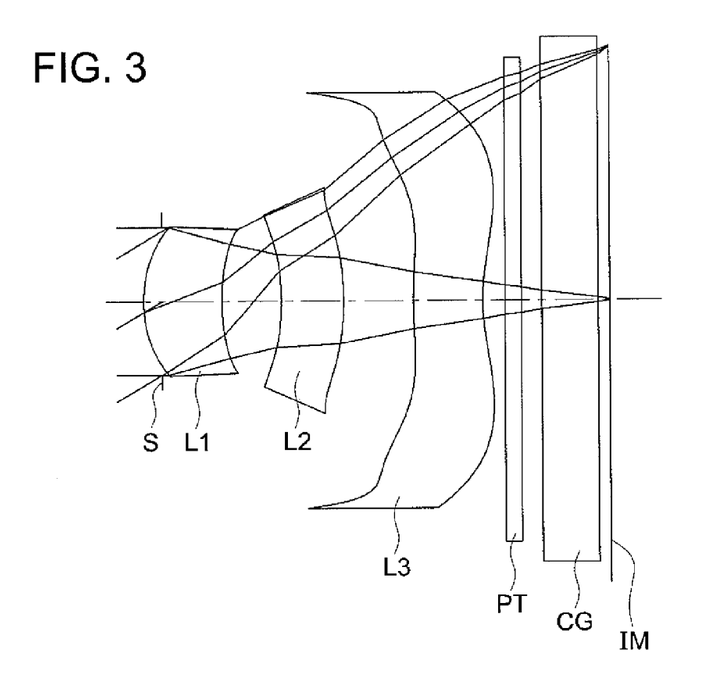
FIG. 3 is a cross-sectional view of the image capturing lens of Example 2.
Figure 4:
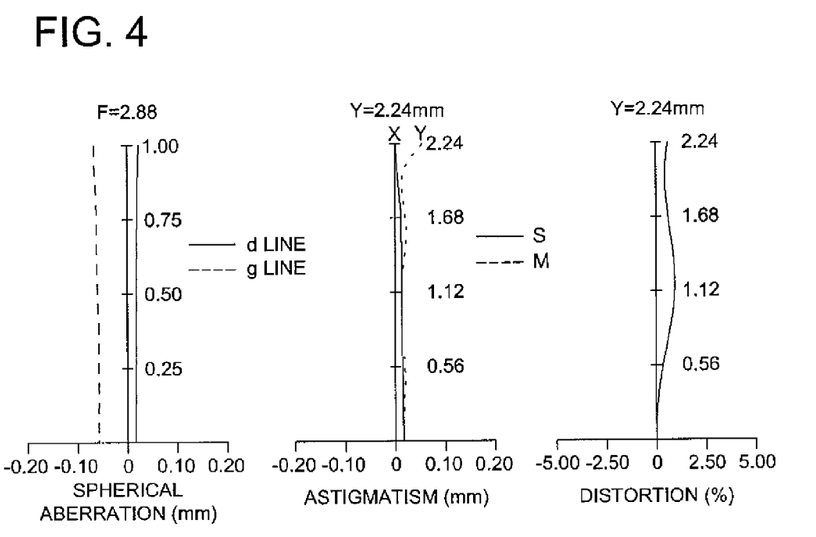
FIG. 4 is the aberration diagram of Example 2.

FIG. 3 is a cross-sectional view of the image capturing lens of Example 2. S represents the aperture stop, L1 represents a first lens, L2 represents a second lens, and L3 represents a third lens. PT represents an optical low-pass filter or IR cut filter, CG represents the cover glass of a solid-state image-capturing element, and I represents the image-capturing surface. FIG. 4 is the aberration diagram (spherical aberration, astigmatism, and distortion) of Example 2.

Example 3

All specifications are shown below.
f=3.62 mm
fB=0.12 mm
F=2.84
2Y=4.48 mm
ENTP=0 mm
EXTP=−2.34 mm
H1=1.72 mm
H2=−3.5 mm
Surface data is shown below.

| Surface Number | R (mm) | D (mm) | Nd | vd | Effective Radius (mm) |
|---|---|---|---|---|---|
| 1 | ∞ | 0.05 | | | 0.63 |
| 2 | ∞ | −0.23 | | | 0.63 |
| 3(*) | 1.031 | 0.66 | 1.58020 | 56.3 | 0.63 |
| 4(*) | 1.882 | 0.58 | | | 0.60 |
| 5(*) | −2.097 | 0.40 | 1.80470 | 24.3 | 0.73 |
| 6(*) | −2.270 | 0.70 | | | 0.97 |
| 7(*) | 7.620 | 0.54 | 1.58020 | 56.3 | 1.60 |
| 8(*) | 2.586 | 0.18 | | | 1.86 |
| 9 | ∞ | 0.15 | 1.51390 | 60.7 | 2.50 |
| 10 | ∞ | 0.10 | | | 2.50 |
| 11 | ∞ | 0.50 | 1.46920 | 61.7 | 2.50 |
| 12 | ∞ | 0.12 | | | |

Aspheric surface coefficients are shown below.
Third Surface
K=0.12989E+00, A4=0.35854E−01, A6=0.81004E−01, A8=−0.18889E−01, A10=0.19757E+00, A12=−0.27042E+00, A14=0.46853E+00
Fourth Surface
K=4.69301E+01, A4=0.33340E−01, A6=−0.66075E−01, A8=0.42942E+00, A10=−0.36034E+00, A12=−0.20868E+01, A14=0.59938E+01
Fifth Surface
K=0.14263E+02, A4=−0.31713E+00, A6=0.28982E+00, A8=−0.46180E+00, A10=−0.37387E+00, A12=−0.35973E+00, A14=0.58538E+01, A16=−0.75098E+01
Sixth Surface
K=−0.44822E+01, A4=−0.85434E−001, A6=0.69014E−01, A8=−0.42386E−01, A10=0.88534E−02, A12=0.23549E−01, A14=0.90293E−01, A16=−0.88386E−01
Seventh Surface
K=0.50000E+02, A4=−0.15163E+00, A6=040238E−01, A8=−0.25854E−02, A10=0.14934E−02, A12=0.54040E−04, A14=−0.28551E−03, A16=0.44231E−04
Eighth Surface
K=−0.66972E+01, A4=−0.10839E+00, A6=0.27237E−01, A8=−0.10388E−01, A10=0.19397E−02, A12=0.15579E−03, A14=−0.12433E−03, A16=0.15264E−04
Single lens data is shown below.

| Lens | Initial Surface | Focal Length (mm) |
|---|---|---|
| 1 | 3 | 3.063 |
| 2 | 5 | 1503.269 |
| 3 | 7 | −7.027 |

Values corresponding to each conditional expression described above are shown below.
(1) TL/f=1.02
(2) (r2+r1)/(r2−r1)=3.420
(3) φm/φp=−429.49
(4) D2/f=0.16
(5) f3f3/f=−1.94
(6) n2=1.80540

Figure 5:
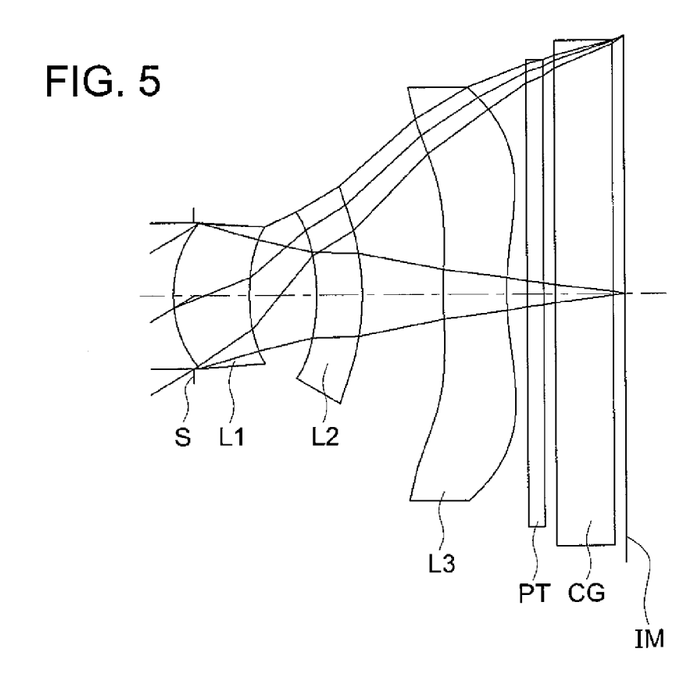
FIG. 5 is a cross-sectional view of the image capturing lens of Example 3.
Figure 6:
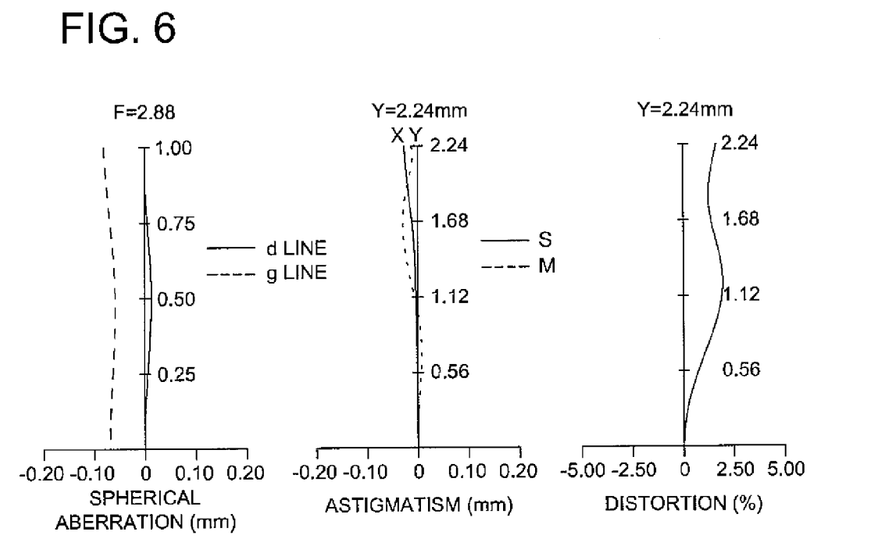
FIG. 6 is the aberration diagram of Example 3.

FIG. 5 is a cross-sectional view of the image capturing lens of Example 3. S represents the aperture stop, L1 represents a first lens, L2 represents a second lens, and L3 represents a third lens. PT represents an optical low-pass filter or IR cut filter, CG represents the cover glass of a solid-state image-capturing element, and I represents the image-capturing surface. FIG. 6 is the aberration diagram (spherical aberration, astigmatism, and distortion) of Example 3,

Example 4

All specifications are shown below.
f=3.39 mm
fB=0.1 mm
F=2.84
2Y=4.48 mm
ENTP=0 mm
EXTP=−2.24 mm
H1=−1.52 mm
H2=−3.29 mm
Surface data is shown below.

| Surface Number | R (mm) | D (mm) | Nd | vd | Effective Radius (mm) |
|---|---|---|---|---|---|
| 1 | ∞ | 0.05 | | | 0.60 |
| 2 | ∞ | −0.23 | | | 0.60 |
| 3(*) | 1.031 | 0.71 | 1.56910 | 71.3 | 0.60 |
| 4(*) | 1.981 | 0.39 | | | 0.58 |
| 5(*) | −2.569 | 0.55 | 1.81360 | 25.7 | 0.67 |
| 6(*) | −2.808 | 0.65 | | | 0.98 |
| 7(*) | 3.252 | 0.56 | 1.58310 | 59.4 | 1.56 |
| 8(*) | 1.795 | 0.20 | | | 1.84 |
| 9 | ∞ | 0.15 | 1.51630 | 64.1 | 2.50 |
| 10 | ∞ | 0.10 | | | 2.50 |
| 11 | ∞ | 0.50 | 1.47140 | 65.2 | 2.50 |
| 12 | ∞ | 0.10 | | | |

Aspheric surface coefficients are shown below.
Third Surface
K=−0.13449E+00, A4=0.39886E−01, A6=0.66366E−01, A8=−0.18976E−01, A10=0.19128E+00, A12=−0.29826E−01, A14=0.76240E−01
Fourth Surface
K=0.74687E+01, A4=0.27397E−01, A6=0.78392E−02, A8=0.19742E+00, A10=−0.28319E+00, A12=−0.49190E+00, A14=0.59938E+01
Fifth Surface
K=−0.26102E+02, A4=−0.33539E+00, A6=0.27367E+00, A8=−0.27429E+00, A10=−0.33272E+00, A12=−0.10195E+01, A14=0.35232E+01, A16=−0.27483E+01
Sixth Surface
K=023386E+01, A4=−0.74690E−01, A6=0.11859E+00, A8=−0.47898E−01, A10=−0.19613E−01, A12=0.16142E−01, A14=0.96339E−01, A 16=−0.74998E−01
Seventh Surface
K=−0.50000E+02, A4=−0.16272E+00, A6=0.37221E−01, A8=−0.26682E−02, A10=0.17860E−02, A 12=0.26062E−03, A14=−0.18932E−03, A16=−0.79133E−05

Eighth Surface
K=−0.11100E+02, A4=−0.93971E−01, A6=0.23628E−01, A8=−0.11736E−01, A10=0.22421E−02, A12=0.15579E−03, A14=−0.12433E−03, A16=0.15264E−04

Single lens data is shown below.

| Lens | Initial Surface | Focal Length (mm) |
|---|---|---|
| 1 | 3 | 2.976 |
| 2 | 5 | 1153.526 |
| 3 | 7 | −7.991 |

Values corresponding to each conditional expression described above are shown below.
(1) TL/f=1.09
(2) (r2+r1)/(r2−r1)=3.170
(3) $\phi m/\phi p$=−200.89
(4) D2/f=0.11
(5) f3/f=−2.36
(6) n2=1.80540

Figure 7:
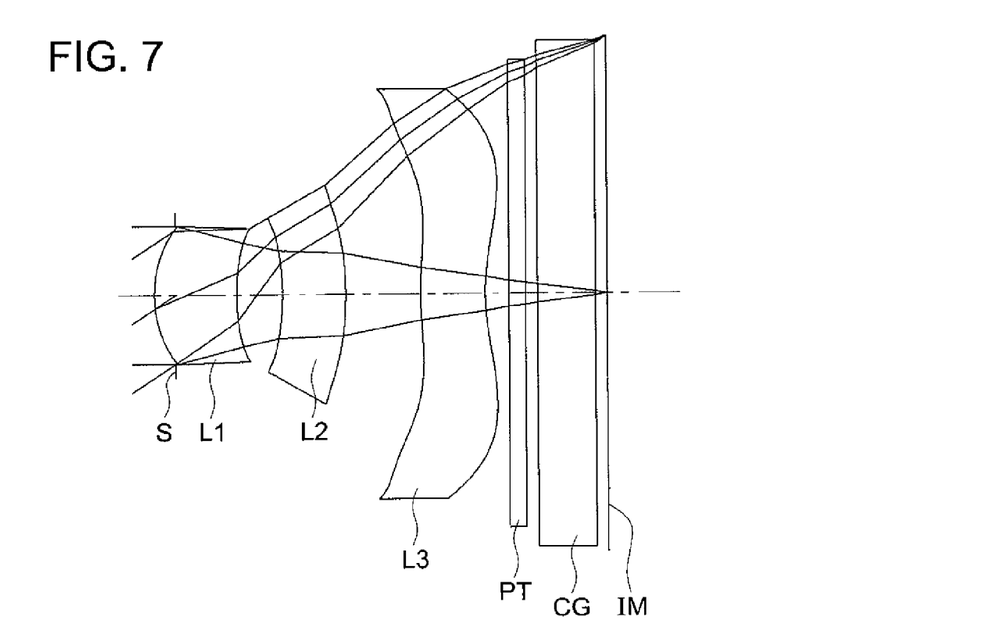
FIG. 7 is a cross-sectional view of the image capturing lens of Example 4.
Figure 8:
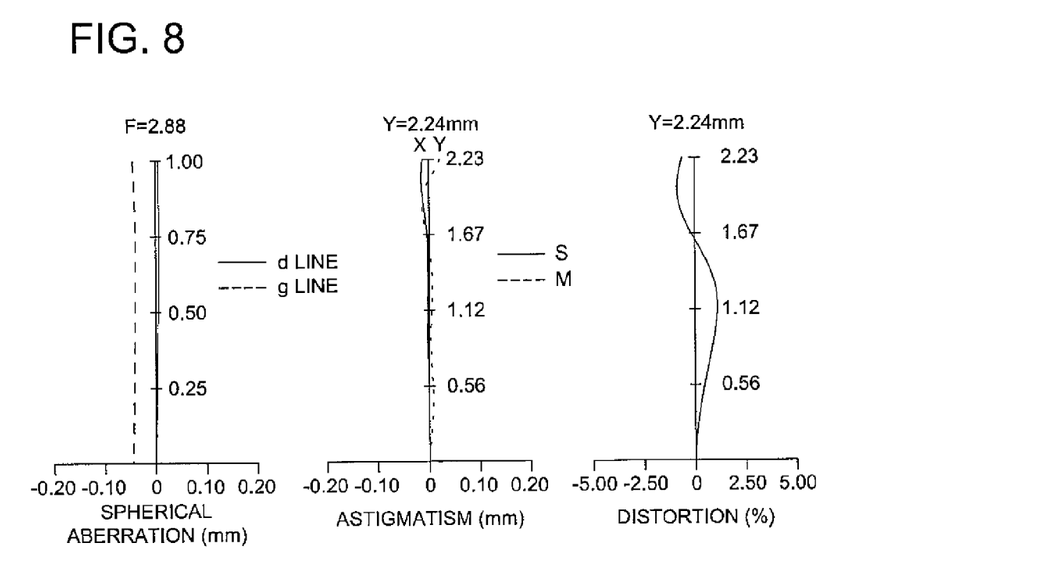
FIG. 8 is the aberration diagram of Example 4.

FIG. 7 is a cross-sectional view of the image capturing lens of Example 4. S represents the aperture stop, L1 represents a first lens, L2 represents a second lens, and L3 represents a third lens. PT represents an optical low-pass filter or IR cut filter, CG represents the cover glass of a solid-state image-capturing element, and I represents the image-capturing surface. FIG. 8 is the aberration diagram (spherical aberration, astigmatism, and distortion) of Example 4.

Example 5

All specifications are shown below.
f=3.5 mm
fB=0.09 min
F=2.84
2Y=4.48 mm
ENTP=0 mm
EXTP=−2.24 mm
H1=−1.75 mm
H2=−3.41 mm
Surface data is shown below.

| Surface Number | R (mm) | D (mm) | Nd | vd | Effective Radius (mm) |
|---|---|---|---|---|---|
| 1 | ∞ | 0.05 | | | 0.62 |
| 2 | ∞ | −0.23 | | | 0.62 |
| 3(*) | 1.104 | 0.78 | 1.56910 | 71.3 | 0.62 |
| 4(*) | 1.904 | 0.53 | | | 0.55 |
| 5(*) | −97.431 | 0.30 | 1.81360 | 25.7 | 0.60 |
| 6(*) | −87.147 | 0.53 | | | 0.64 |
| 7(*) | 5.206 | 0.73 | 1.58310 | 59.4 | 0.72 |
| 8(*) | 2.638 | 0.18 | | | 0.82 |
| 9 | ∞ | 0.15 | 1.51630 | 64.1 | 2.50 |
| 10 | ∞ | 0.10 | | | 2.50 |
| 11 | ∞ | 0.50 | 1.47140 | 65.2 | 2.50 |
| 12 | ∞ | 0.09 | | | |

Aspheric surface coefficients are shown below.
Third Surface
K=−0.21222E+00, A4=0.25445E−01, A6=0.51251E−01, A8=−0.59334E−01, A10=0.16782E+00, A12=−0.54255E−01, A14=−0.59734E−01
Fourth Surface
K=0.53302E+01, A4=0.40186E−01, A6=−0.15845E+00, A8=0.55845E+00, A10=0.11682E−01, A12=−0.34101E+01, A14=0.59938E+01
Fifth Surface
K=−0.50000E+02, A4=−0.13696E+00, A6=0.10524E+00, A8=−0.28614E+00, A10=0.79964E−01, A12=−0.82943E+00, A14=0.22925E+01, A16=−0.19808E+01
Sixth Surface
K=0.50000E+02, A4=−0.10949E+00, A6=0.96865E−01, A8=−0.68514E−01, A10=−0.37220E−01, A12=−0.13706E−02, A14=0.92030E−01, A16=−0.51516E−01
Seventh Surface
K=−0.23734E+02, A4=−0.17456E+00, A6=0.40097E−01, A8=0.19614E−02, A10=0.25368E−02, A12=−0.27152E−03, A14=−0.53792E−03, A16=0.93865E−04
Eighth Surface
K=−0.53229E+01, A4=−0.10922E+00, A6=0.25954E−01, A8=−0.11196E−01, A10=0.21171E−02, A12=0.15579E−03, A14=−0.12433E−03, A16=0.15264E−04

Single lens data is shown below.

| Lens | Initial Surface | Focal Length (mm) |
|---|---|---|
| 1 | 3 | 3.410 |
| 2 | 5 | 1001.513 |
| 3 | 7 | −10.240 |

Values corresponding to each conditional expression described above are shown below.
(1) TL/f=1.05
(2) (r2+r1)/(r2−r1)=3.760
(3) $\phi m/\phi p$=−333.51
(4) D2/f=0.15
(5) f3/f=−2.93
(6) n2=1.80540

Figure 9:
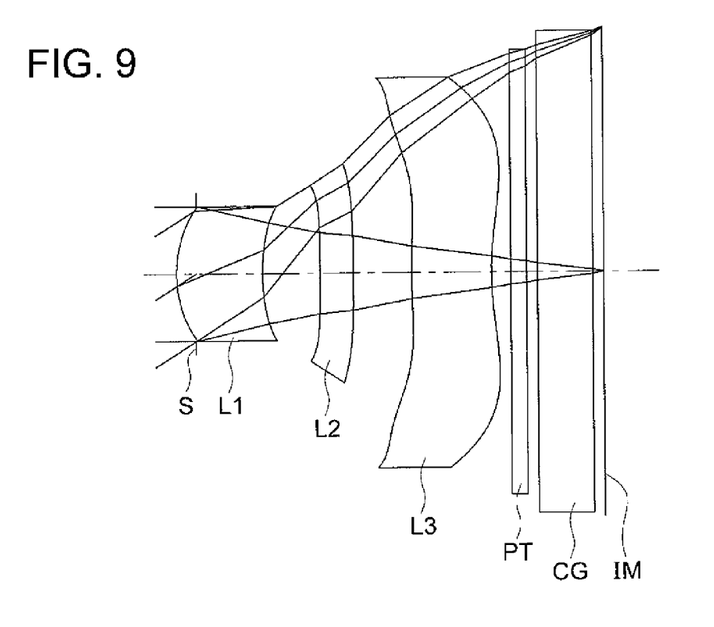
FIG. 9 is a cross-sectional view of the image capturing lens of Example 5.
Figure 10:
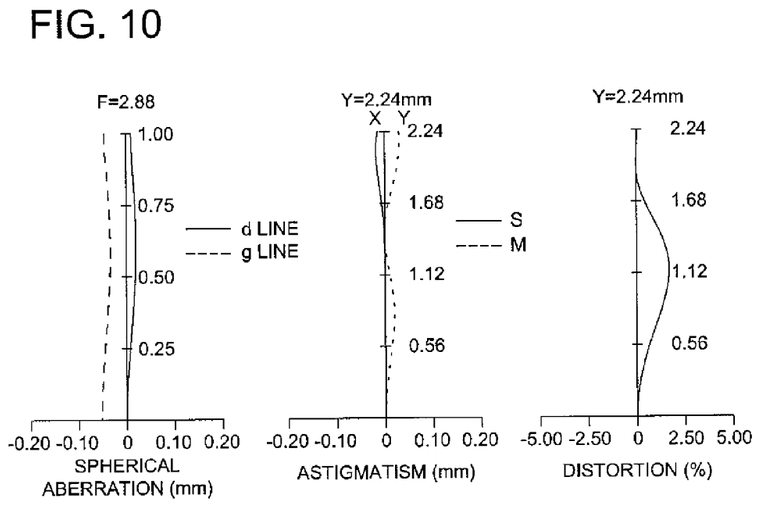
FIG. 10 is the aberration diagram of Example 5.

FIG. 9 is a cross-sectional view of the image capturing lens of Example 5. S represents the aperture stop, L1 represents a first lens, L2 represents a second lens, and L3 represents a third lens. PT represents an optical low-pass filter or IR cut filter, CG represents the cover glass of a solid-state image-capturing element, and I represents the image-capturing surface. FIG. 10 is the aberration diagram (spherical aberration, astigmatism, and distortion) of Example 5.

DESCRIPTION OF THE SYMBOLS

S: aperture stop
L1: first lens
L2: second lens
L3: third lens
PT: optical low-pass filter or IR cut filter
CG: the cover glass of a solid-state image-capturing element
I. image-capturing surface

The invention claimed is:
1. An image-capturing lens having, in order from an object side:
   a first lens of a meniscus shape with a positive power near an optical axis and having a convex surface facing the object side and a concave surface facing an image side;
   a second lens of an aspherical shape with a positive power near the optical axis and a negative power in the periphery; and
   a third lens of a meniscus shape having a convex surface facing the object side and a concave surface facing the image side near the optical axis,
   wherein the following conditional expressions are satisfied:

$$TL/f<1.10$$

$$2.00<(r2+r1)/(r2-r1)<4.00$$

$$0.07<D2/f<0.17$$

where TL is an air-converted distance from the object side surface to the image side surface of the first lens, f is a focal length of a total system, r2 is a curvature radius of the image side surface of the first lens, r1 is a curvature radius of the object side surface of the first lens, and D2 is a paraxial distance of the first lens and the second lens.

2. The image capturing lens of claim 1, wherein an aperture stop is arranged on the object side of the first lens.

3. The image capturing lens of claim 1, wherein the second lens satisfies the following conditional expression:

$$\phi m/\phi p<-10$$

where $\phi m$ is a power of the second lens in a position of a maximum light height and $\phi p$ is a power of the second lens near the optical axis.

4. The image capturing lens of claim 1, wherein the third lens has a negative power near the optical axis.

5. The image capturing lens of claim 4, wherein the third lens satisfies the following conditional expression:

$$-3.30<f3/f<-1.30$$

where f3 is a focal length of the third lens near the optical axis.

6. The image capturing lens of claim 1, wherein at least the image side surface of the third lens is formed into an aspherical surface and the aspherical surface has at least one aspherical inflection point.

7. The image capturing lens of claim 1, wherein the second lens satisfies the following conditional expression:

$$n2>1.55$$

where n2 is a refractive index in d line of the second lens.

8. The image capturing lens of claim 1, wherein the first lens, the second lens, and the third lens are constructed of a material having heat resistance.

* * * * *